(12) United States Patent
Maguire

(10) Patent No.: US 9,338,306 B2
(45) Date of Patent: May 10, 2016

(54) PROCESSING USAGE INFORMATION FOR MACHINE-TO-MACHINE COMMUNICATION

(75) Inventor: Patrick Maguire, Ballinamore (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 73 days.

(21) Appl. No.: 14/354,308

(22) PCT Filed: Oct. 28, 2011

(86) PCT No.: PCT/EP2011/069027
§ 371 (c)(1),
(2), (4) Date: Oct. 13, 2014

(87) PCT Pub. No.: WO2013/060387
PCT Pub. Date: May 2, 2013

(65) Prior Publication Data
US 2015/0105044 A1   Apr. 16, 2015

(51) Int. Cl.
*H04M 15/00* (2006.01)
*H04L 29/08* (2006.01)
(Continued)

(52) U.S. Cl.
CPC ........... *H04M 15/58* (2013.01); *H04L 12/1432* (2013.01); *H04L 67/16* (2013.01);
(Continued)

(58) Field of Classification Search
CPC ..... H04W 15/00; H04W 15/38; H04W 15/41; H04W 15/44; H04W 15/48; H04W 15/51; H04W 15/52; H04W 4/00; H04W 4/005; H04W 4/24; H04M 15/00; H04M 15/38; H04M 15/41; H04M 15/44; H04M 15/48; H04M 15/51; H04M 15/52
USPC ................................................. 455/405, 406
See application file for complete search history.

(56) References Cited

U.S. PATENT DOCUMENTS 5,852,630 A * 12/1998 Langberg ............ H04L 27/2647
375/219
8,943,221 B2 * 1/2015 McNamee .............. H04L 45/42
709/217

(Continued)

FOREIGN PATENT DOCUMENTS

EP   2341660 A1   7/2011

OTHER PUBLICATIONS

3GPP, "3rd Generation Partnership Project; Technical Specification Group Services and System Aspects; Study on Facilitating Machine to Machine Communication in 3GPP Systems; (Release 8)" 3GPP TR 22.868 V8.0.0, Mar. 2007; 15 pages.
ETSI, "Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 version 11.9.0 Release 11)", ETSI TS 129 272 V11.9.0, Dec. 2013, 125 pages.
(Continued)

*Primary Examiner* — Siu Lee
(74) *Attorney, Agent, or Firm* — Rothwell, Figg, Ernst & Manbeck, P.C.

(57) ABSTRACT

An M2M service provider (41) is a provider of a plurality of services (31-33). A method of processing charging information for machine-to-machine (M2M) communication between at least one M2M device (10) and an M2M service provider (41) comprises creating (102) a charging record (90) for recording usage information of the plurality of services (31-33) of the service provider (41). For each of the plurality of services (31-33) of the service provider (41), per-service usage information (94) is accumulated (105). Usage of the service by the at least one M2M device (10) is aggregated. The per-service usage information (94) is stored (108) in the charging record (90). The charging record can include at least one volume-based limit or time-based limit for publishing the charging record.

15 Claims, 6 Drawing Sheets

(51) Int. Cl.
*H04W 4/00* (2009.01)
*H04W 4/24* (2009.01)
*H04L 12/14* (2006.01)

(52) U.S. Cl.
CPC ............ *H04M 15/41* (2013.01); *H04M 15/43* (2013.01); *H04M 15/44* (2013.01); *H04M 15/8038* (2013.01); *H04W 4/005* (2013.01); *H04W 4/24* (2013.01); *H04L 12/1417* (2013.01); *H04L 12/1435* (2013.01); *H04L 12/1439* (2013.01)

(56) References Cited

U.S. PATENT DOCUMENTS

| | | | | |
|---|---|---|---|---|
| 2008/0153521 | A1* | 6/2008 | Benaouda | G01D 4/004 455/466 |
| 2010/0198698 | A1* | 8/2010 | Raleigh | G06Q 30/0601 705/26.1 |
| 2011/0053619 | A1 | 3/2011 | Shaheen et al. | |
| 2012/0047551 | A1* | 2/2012 | Pattar | H04W 4/00 726/1 |
| 2012/0113855 | A1* | 5/2012 | Wu | H04L 12/14 370/252 |
| 2012/0275348 | A1* | 11/2012 | Zhou | H04L 12/14 370/259 |
| 2013/0017827 | A1* | 1/2013 | Muhanna | H04W 4/005 455/426.1 |
| 2013/0188515 | A1* | 7/2013 | Pinheiro | H04W 4/001 370/254 |
| 2013/0329653 | A1* | 12/2013 | Russell, Jr. | H04W 4/005 370/329 |

OTHER PUBLICATIONS

ETSI, "Digital cellular telecommunications system (Phase 2+); Universal Mobile Telecommunications System (UMTS); Numbering, addressing and identification (3GPP TS 23.003 version 11.8.0 Release 11)", ETSI TS 123 003 V11.8.0, Mar. 2014, 86 pages.

ETSI, "Digital cellular telecommunications system (Phase 2+); Universal Mobile Telecommunications System (UMTS); General Packet Radio Service (GPRS); Service description; Stage 2 (3GPP TS 23.060 version 11.9.0 Release 11)", ETSI TS 123 060 V11.9.0, Mar. 2014, 338 pages.

ETSI, "Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 11.9.0 Release 11)", ETSI TS 129 060 V11.9.0, Mar. 2014, 179 pages.

ETSI, "Digital cellular telecommunications system (Phase 2+); Universal Mobile Telecommunications System (UMTS); LTE; Telecommunication management; Charging management; Charging Data Record (CDR) parameter description (3GPP TS 32.298 version 11.9.0 Release 11)", ETSI TS 132 298 V11.9.0, Mar. 2014, 159 pages.

"3rd Generation Partnership Project; Technical Specification Group Services and System Aspects; Study on Facilitating Machine to Machine Communication in 3GPP Systems; (Release 8)", 3GPP Standard; 3GPP TR 22.868, 3rd Generation Partnership Project (3GPP), Mobile Competence Centre; 650, Route Des Lucioles; F-06921 Sophia-Antipolis, Cedex France, No. V8.0.0, Mar. 1, 2007, pp. 1-15, XP050361381.

* cited by examiner

PROCESSING USAGE INFORMATION FOR MACHINE-TO-MACHINE COMMUNICATION

CROSS-REFERENCE TO RELATED APPLICATION

This application is a 35 U.S.C. §371 National Phase Entry Application from PCT/EP2011/069027, filed Oct. 28, 2011, and designating the United States.

TECHNICAL FIELD

This invention relates to a method of processing usage information for machine-to-machine communication, and to apparatus for performing the method.

BACKGROUND

Currently, the basic unit for gathering charging information on a communication network is a Call Detail Record (CDR). An individual CDR is generated for every activity on the Gateway GPRS Support Node (GGSN) involving customer interactions with the service provider's network, and even for some internal administrative activities. Generated CDRs can be transferred to a billing system (BS) via file-based output, using File Transfer Protocol (FTP), or near-real-time output, using GPRS Tunneling Protocol Prime (GTP').

At the present time, the majority of communications activities can be classed as Human-to-Human (H2H) communication, as they involve a human user making or receiving a voice call or message, sending or receiving a message, or accessing a data network such as an Enterprise network or the Internet. A rapidly emerging area is Machine-to-Machine (M2M) communication. In this type of communication, an M2M device can communicate with a server of an M2M service provider via a network, without a human user being involved.

M2M communication can, in some cases, involve a very small amount of data being sent over the network. The frequency with which data is sent can vary widely according to the service, and can occur on a frequent basis, or a very infrequent basis. If the conventional practice of generating CDRs is applied to M2M communication, the size of a CDR could often be larger than the actual use of the network that the CDR is recording and the overall volume of data required to record network usage becomes unnecessarily large.

WO 2011/083065A1 describes handling of M2M services in a communication system and provides global charging information for a plurality of M2M terminals using a same M2M service. An entity creating charging information agglomerates charging information associated with a terminal supporting a M2M service with charging information associated with other terminals supporting the M2M service.

The present invention seeks to provide an alternative way of processing usage information for M2M communication.

SUMMARY

An aspect of the present invention provides a method of processing charging information for machine-to-machine (M2M) communication between at least one M2M device and an M2M service provider. The service provider is a provider of a plurality of services. The method comprises creating a charging record for recording usage information of the plurality of services of the service provider. The method further comprises, for each of the plurality of services of the service provider, accumulating per-service usage information, wherein usage of the service by the at least one M2M device is aggregated. The method further comprises storing the per-service usage information in the charging record.

An advantage of an embodiment of the invention is that the charging record can record usage information for a plurality of services, rather than just a single service. This can allow a significant reduction in the number of charging records that are maintained by the operator network, and a significant reduction in the amount of charging-related data sent over the network. Usage of each service by one or more M2M devices is aggregated. This avoids the need to create and send a charging record for each individual device's usage of the service.

Advantageously, the method further comprises accumulating usage information for the plurality of services of the service provider and stores the usage information in the charging record.

Optionally, the method can accumulate per-M2M device usage information for an individual one of the services of the service provider and store the per-M2M device usage information in the charging record.

Advantageously, the method further comprises publishing the charging record. Publishing means making the charging record available to other entity in the network, such as a charging gateway (CGW) or a billing system (BS).

The charging record can comprise at least one limit which determines when the charging record will be published. The limit can be a volume-based limit or a time-based limit. A limit can be set at the per-service level and/or or at the per-subscription level. The limit, or limits, allow the network operator to determine how often the charging record is published. M2M services can vary widely in the amount of data that they send over the network, and the frequency with which they send data. The limit, or limits, allow the network operator to control the frequency with which charging records, despite the widely differing demands of services.

Another aspect of the invention provides apparatus for creating charging information in a network in which there is machine-to-machine, M2M, communication between at least one M2M device and an M2M service provider. The service provider is a provider of a plurality of services. The apparatus comprises a module which is arranged to create a charging record for recording usage information of the plurality of services of the service provider. The apparatus further comprises a module which is arranged to, for each of the plurality of services of the service provider, accumulate per-service usage information. Usage of the service by the at least one M2M device is aggregated. The apparatus further comprises a module which is arranged to store the per-service usage information in the charging record.

The apparatus can be further arranged to implement any other features of the described method.

The apparatus can be implemented at a Gateway GPRS Support Node (GGSN) or a Service GPRS Support Node (SGSN), or at any other entity in the network which is responsible for gathering information about usage of the network resources by devices.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the invention will be described, by way of example only, with reference to the accompanying drawings in which.

DETAILED DESCRIPTION

Figure 1:
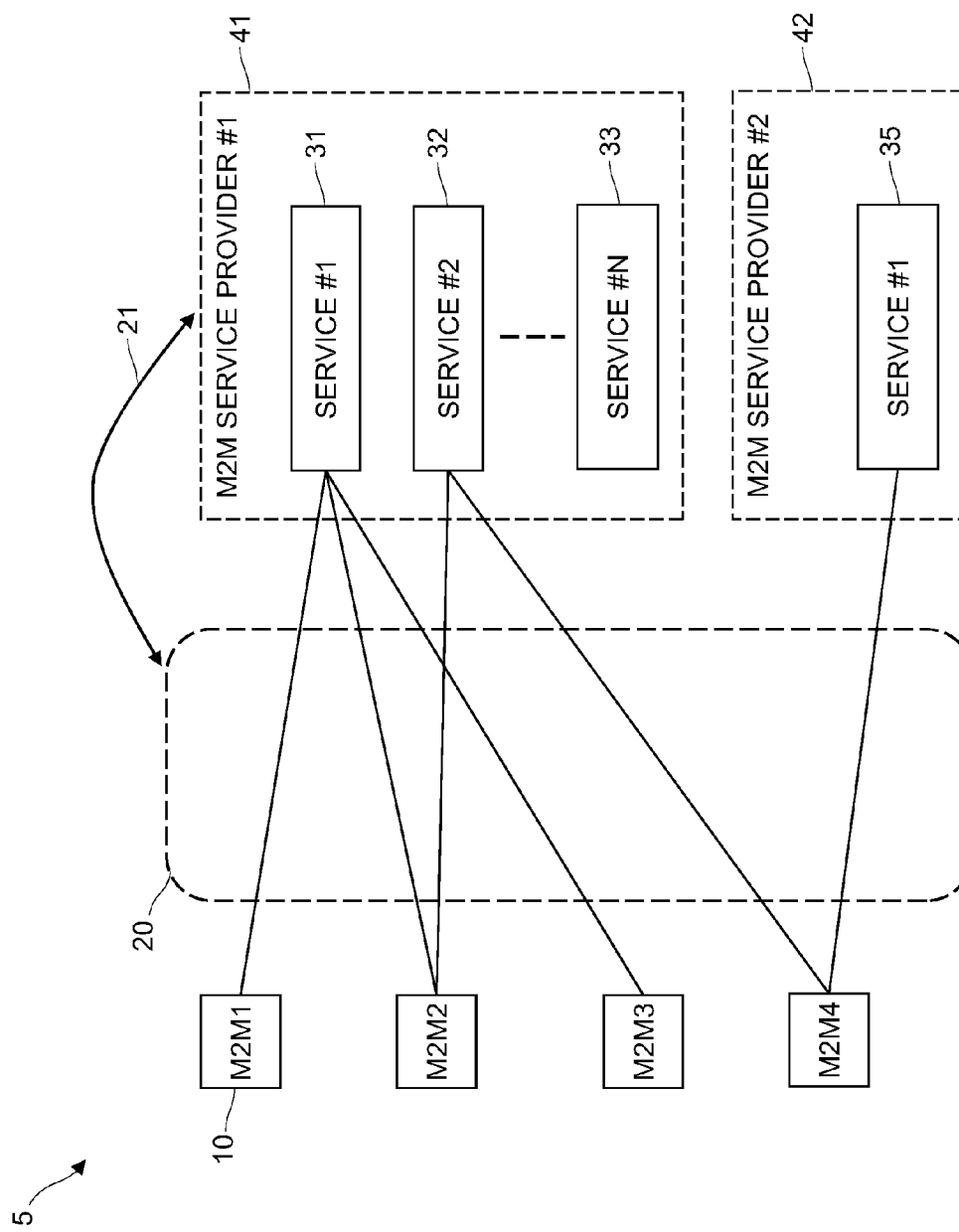
FIG. 1 shows a communication system supporting M2M communication, showing the relationship between M2M devices, M2M service providers and a network 20.

FIG. 1 shows a communication system 5 supporting M2M communication, and shows the relationship between M2M devices 10 and M2M service providers 41, 42. At least part of the communication path between M2M devices 10 and M2M service providers 41, 42 is provided via a communication network 20, such as an operator's network (e.g. a Public Land Mobile Network (PLMN) of a particular operator.) An M2M service provider 41, 42 can provide one or more different M2M services. In FIG. 1, M2M service provider #1 41 provides N services 31-33 and M2M service provider #2 42 provides a single service 35. Four M2M devices M2M1-M2M4 are shown. Devices M2M1-M2M3 subscribe to service #1 31 of M2M service provider #1 41, devices M2M2, M2M4 subscribe to service #2 32 of M2M service provider #1 41, and device M2M4 subscribes to service #1 of M2M service provider #2 42. An M2M device 10 can subscribe to one or more different services. For example, device M2M2 subscribes to multiple services 31, 32. M2M devices 10 use communication network 20 to access the services. For example, a remote meter reading service may comprise a server at M2M service provider #1 sending a request to an M2M device 10 over network 20, and receiving a reply from the M2M device 10 via the network 20, where the reply includes the meter reading. A non-exhaustive list of M2M devices and services can include areas such as security (e.g. surveillance systems), tracking or tracing (e.g. tracing parcels from point of despatch to point of delivery), payment (e.g. point of sale, vending machines), health (e.g. monitoring patient vital signs), remote maintenance (e.g. sensors, diagnostics, software updates) and metering (e.g. remote meter reading).

For M2M communications, there is a relationship 21 between the service provider 41 and the operator of network 20 for usage of the network 20 to fulfil the services of the service provider. An owner/user of an M2M device 10 may enter into a contract with an M2M service provider 41, 42 for a service and pay an annual fee which includes access to the network 20. Alternatively, a person may purchase an M2M device 10 and the purchase cost of the device may include access to the network 20. In both cases, there is no direct billing relationship between the owner of the M2M device 10 and the operator of network 20. This contrasts with a conventional arrangement for H2H services, where an individual user of an H2H device has a subscription with a network operator 20 and is billed directly for any usage made of the network by their device.

Figure 2:
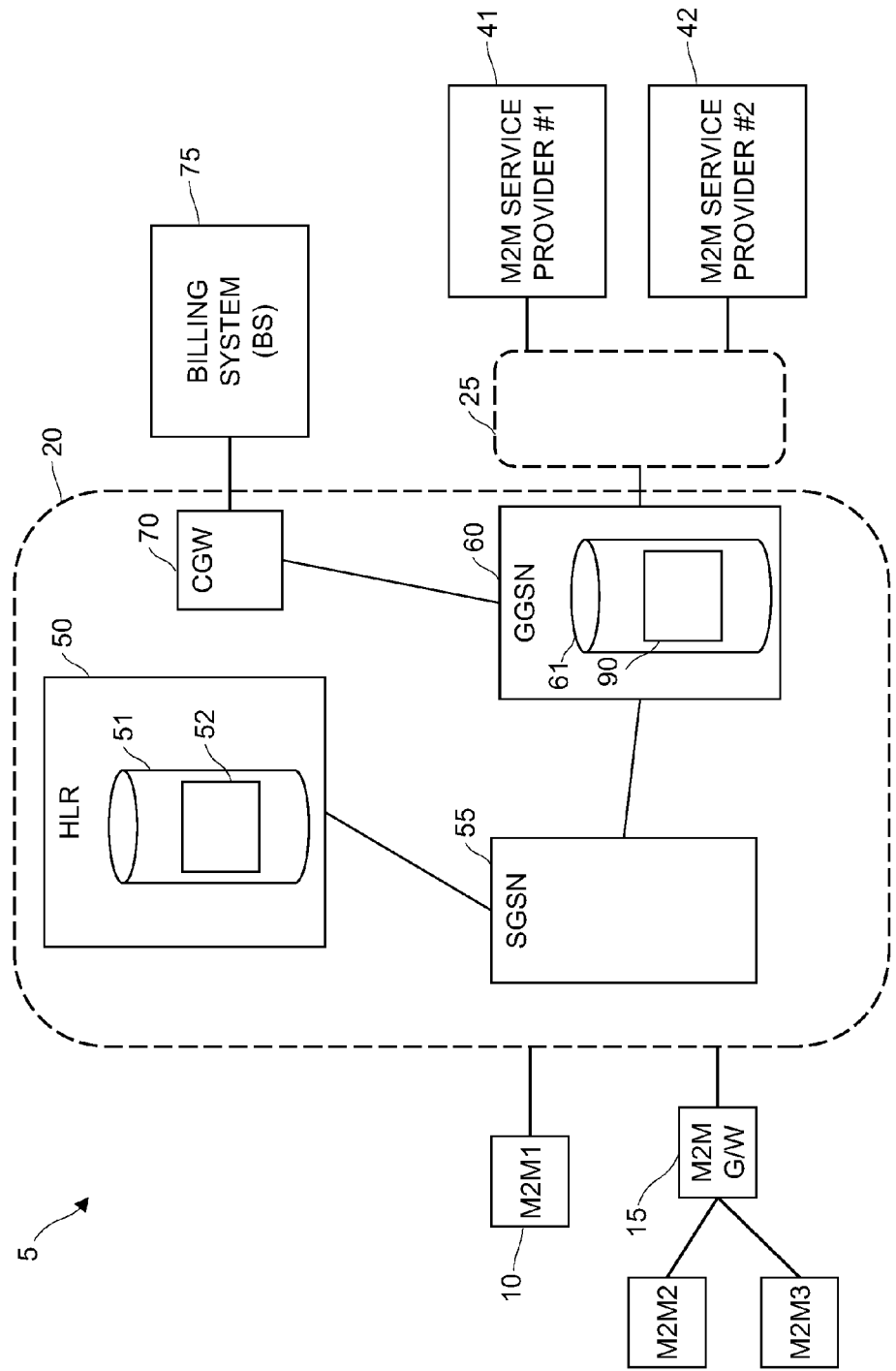
FIG. 2 shows a more detailed view of the communication system.

FIG. 2 shows the system in more detail. Entities of a 3GPP wireless operator's network are shown in FIG. 2 as an example, but the network can be a different type of network. An M2M device 10 can connect directly to the operator network 20, or can connect to the operator network 20 via an M2M gateway 15. M2M service providers 41, 42 may connect to the operator's network 20. Alternatively, as shown in FIG. 2, there may be one or more packet data networks 25 (e.g. a private IP network) connecting operator network 20 and service providers 41, 42. The operator network 20 can comprise one or more different types of network, such as wireless and wired networks. The two main routing entities in the network 20 are a Serving GPRS Support Node (SGSN) 55 and a Gateway GPRS Support Node (GGSN) 60. An entity in the network stores subscription information. In FIG. 2, subscription information 52 is stored 51 in a Home Location Register (HLR) 50. The subscription information can comprise subscription data per M2M device/service user, with each user being identified by an International Mobile Subscriber Identity (IMSI) or other unique identifier. Subscription information is described in more detail below. A data session between an M2M device 10 and an M2M service provider 41, 42 is routed through network 20 via the Serving GPRS Support Node (SGSN) 55 and the Gateway GPRS Support Node (GGSN) 60.

A billing system (BS) 75 records usage of the resources of network 20. Usage information or charging information is routed to the billing system 75 via a Charging Gateway (CGW) 70. The billing system 75 collects data from various sources, including the GGSN, to determine a monetary bill for each of the service providers 41, 42.

Figure 3:
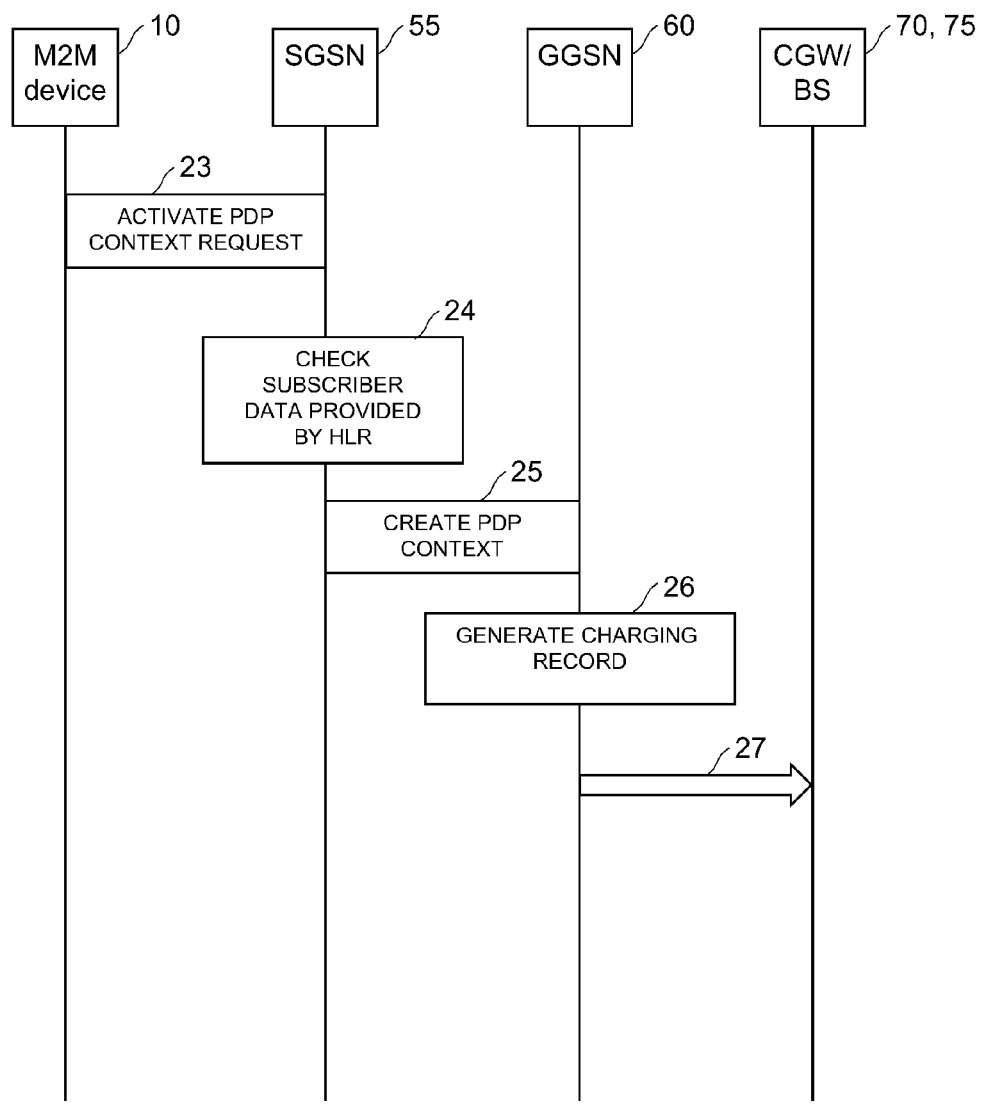
FIG. 3 shows message flows between entities in the system of FIG. 2.

FIG. 3 shows signalling flows between network entities when an M2M device 10 requests data communication in the network of FIG. 2. Upon receiving an Activate PDP Context Request message 23 or an Activate Secondary PDP Context Request message, the SGSN 55 initiates procedures to set up PDP contexts. The first procedure includes checking 24 subscriber data held in the HLR for the M2M device. This ensures that the M2M device 10 is entitled to use the resources of the network 20. PDP context is created at step 25. If no charging record exists for the per-service provider subscription, the GGSN 60 generates a charging record at step 26 and records usage information. When a per-service or per-subscription limit in a charging record is reached, the charging record is issued or published at step 27. The term "charging record" means a record that collects information that will be used to charge the subscriber. The subscriber in this case is the M2M service provider. The charging record collects usage information. Typically, the billing system 75 converts usage information from charging records into a monetary bill for each service provider.

The SGSN 55 determines Charging Characteristics from the Subscribed Charging Characteristics and/or PDP Context Charging Characteristics depending on the presence of the information 52 in the HLR 50. The charging characteristics information element is a way of informing both the SGSN 55 and GGSN 60 of the rules for producing charging information based on operator configured triggers. The Charging Characteristics field allows the operator to apply different kind of charging methods. A subscriber may have Charging Characteristics assigned to his subscription. These characteristics can be supplied by the HLR 50 to the SGSN 55 as part of the subscription information, and, upon activation of an IP-CAN bearer, the SGSN 55 forwards the charging characteristics to the GGSN/S-GW 60. An optional information element included in the Activate PDP Context Request received by SGSN 55 is Access point name. The purpose of the Access point name information element is to identify the packet data network to which the user wishes to connect and to notify the access point of the packet data network that wishes to connect to the device 10. The Access point name is a label or a fully qualified domain name according to DNS naming conventions. The APN comprises two parts:

- an APN Network Identifier; this defines to which external network the GGSN/PGW is connected and optionally a requested service by the MS. This part of the APN is mandatory.
- The APN Operator Identifier; this defines in which PLMN GPRS/EPS backbone the GGSN/PGW is located. This part of the APN is optional.

Subscription data 52 stored in the HLR, per International Mobile Subscriber Identity (IMSI), where an IMI can correspond to an M2M device/M2M service user, can include:

1. subscriptionID. The subscriptionID is an identifier which identifies the relationship (21, FIG. 1) between the M2M service provider 41, 42 and the operator of network 20. The same subscriptionID will occur in each M2M device that subscribes to one of the services of the service provider corresponding to the;
2. subscriptionType, {H2H, M2M};
3. deviceType, {Fixed, Mobile};
4. serviceID/enabled service;
5. aPNID/enabled service. APN parameter must also include service information to enable serviceID mapping. The APN parameter allows a service request to contact the actual service on the service provider host server.
6. CCProfile/enabled service.
7. gtp-PrimeGateway
8. transfer-Type. This parameter identifies the type of transfer to be used when the charging record is issued to the Charging Gateway (CGW)/Billing System (BS).

The subscription data held in the HLR 50 incorporates subscription level and service level information. A set of new charging characteristic profiles can be dedicated to M2M transactions. M2M Charging data generated in SGSN or GGSN can be forwarded (push/pull) to 'clearing house' or CGW/BS on a subscription level. The volume of charging records generated by SGSN or GGSN can be configured by operator based on time and/or volume limits and is a trade-off between storage capacity on GGSN and charging traffic generated.

If an M2M device subscribes to more than one service of a particular service provider (e.g. device M2M2 in FIG. 1) then the HLR data for that device can list multiple serviceIDs under the subscriptionID which identifies the subscription between the service provider and the network operator.

If an M2M device subscribes to services of more than one service provider (e.g. device M2M4 in FIG. 1) then the HLR data for that device lists the subscriptionID for each service provider, which identifies the subscription between each service provider and the network operator, and also lists the serviceIDs of the services.

According to an embodiment, a set of charging characteristic profiles are provided at the SGSN and GGSN for M2M communication. Advantageously, when using one of the M2M CC profiles, conventional per-chargeable event type CDR generation is disabled, such as by setting the "no-call-detail" field.

Each M2M service can be mapped to one of the M2M CC profiles. The CCProfile entry in the HLR is a reference (or "pointer") to a M2M CC profile that should be used to complete data values for the various per-service limits when creating a charging record. The M2M CC profiles are defined by two parameters:

Data Volume Range;

Average Periodicity of Data Transfer Range.

A plurality of different CC profiles can be provided. The following table shows a set of 16 M2M CC Profiles. A larger, or smaller, number of CC profiles can be defined.

| FREQUENCY | VOLUME | | | |
| --- | --- | --- | --- | --- |
| | LOW | LOW-MEDIUM | MEDIUM-HIGH | HIGH |
| LOW | M2M_CC_1 | M2M_CC_2 | M2M_CC_3 | M2M_CC_4 |
| LOW-MEDIUM | M2M_CC_5 | M2M_CC_6 | M2M_CC_7 | M2M_CC_8 |
| MEDIUM-HIGH | M2M_CC_9 | M2M_CC_10 | M2M_CC_11 | M2M_CC_12 |
| HIGH | M2M_CC_13 | M2M_CC_14 | M2M_CC_15 | M2M_CC_16 |

The volume and frequency ranges can be configured by the network operator.

Additionally, associated with each CC profile are parameters which are used to determine when M2M charging records are made available to the charging system:

- subscriptionVolumeLimitULNonroaming (if exceeded, publish file)
- subscriptionVolumeLimitDLNonroaming (if exceeded, publish file)
- subscriptionVolumeLimitULRoaming (if exceeded, publish file)
- subscriptionVolumeLimitDLRoaming (if exceeded, publish file)
- servicetimeLimit (if exceeded, publish file)
- serviceVolumeLimitULNonroaming (if exceeded, publish file)
- serviceVolumeLimitDLNonroaming (if exceeded, publish file)
- serviceVolumeLimitULRoaming (if exceeded, publish file)
- serviceVolumeLimitDLRoaming (if exceeded, publish file)

The above is an example list of parameters. Not all of these parameters may be configured. For example, only per-service limits may be defined in the M2M CC profile.

Charging data is written to a M2M charging record, created on a per-subscription level. The subscription related file may have one or more associated enabled services and each service may have one or more M2M devices with the service enabled. Additionally, M2M devices may have one or more services enabled. Charging data will be written to file per M2M device per PDP context based on selected charging profile.

Figure 4:
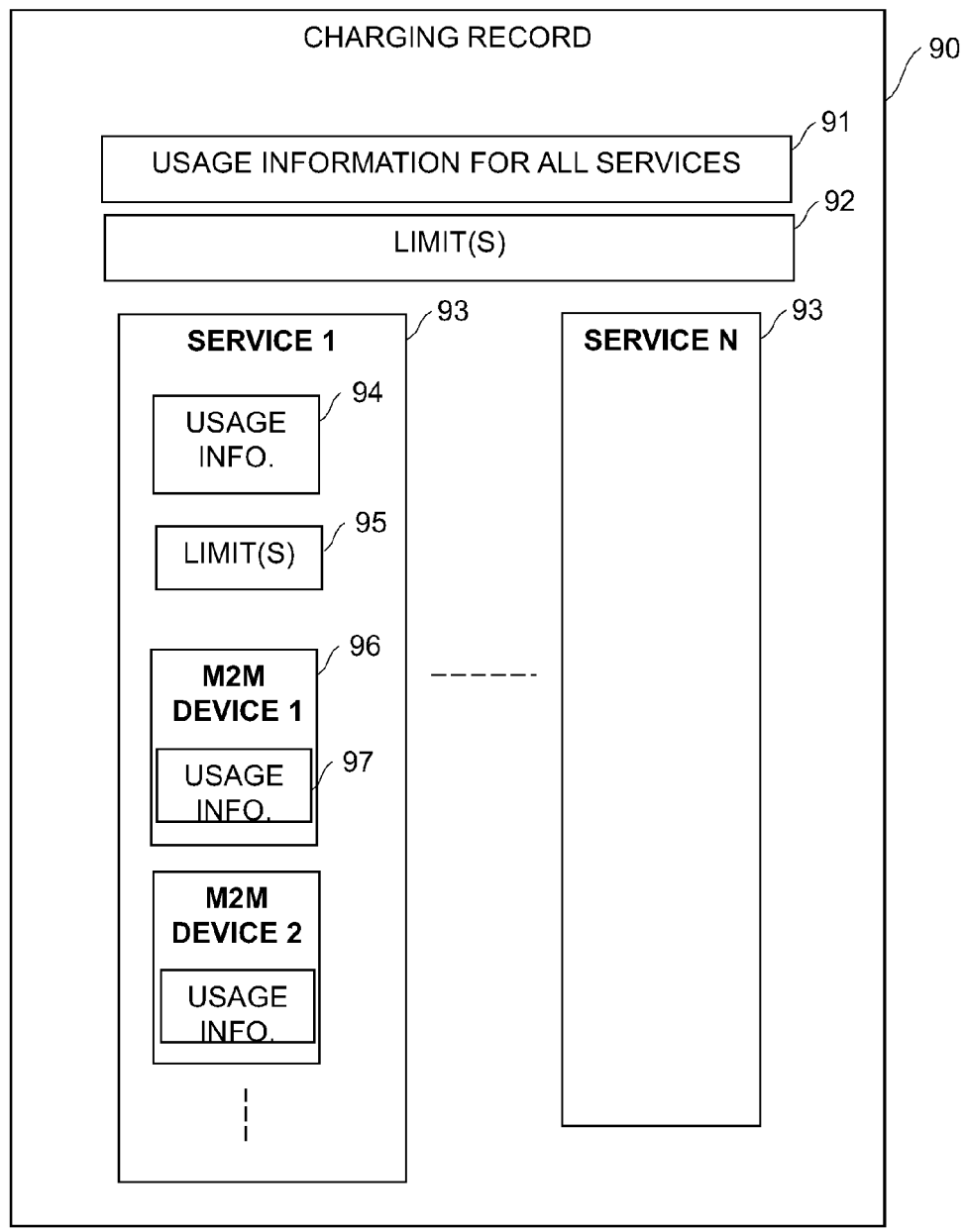
FIG. 4 shows an example charging record.

FIG. 4 shows a charging record 90 which can be generated by an entity such as the GGSN or SGSN. The charging record comprises a plurality of sections 93, each storing data for a particular one of the services. Each section 93 comprises a sub-section 94 for recording usage information of the services by one or more devices. The usage information can be recorded as an overall value. Additionally, or alternatively, it can be recorded on a finer level, such as: uplink usage and downlink usage; roaming usage and non-roaming usage; or a combination of these, i.e. UL non-roaming usage, UL roaming usage, DL non-roaming usage, DL roaming usage etc. Each section can also comprise a sub-section which specifies any limits for when a charging record should be published. Limits can be expressed as a data volume or a time period. The record 90 can comprise both a data volume-based limit and a time-based limit.

Optionally, each section 93 of the charging record can comprise a sub-section 96 for recording usage information 97 on a per-device basis.

The charging record 90 shown in FIG. 4 also comprises a section 91 for recording combined (or aggregated) usage information for all of the services, i.e. the combined usage of service 1, service 2, . . . service N. This can also be called per-subscription usage information, because it is the total usage information for the subscription between the service provider and the network operator. As with the per-service usage information, the per-subscription usage information can be recorded on a finer level, such as: uplink usage and downlink usage; roaming usage and non-roaming usage; or a combination of these, i.e. UL non-roaming usage, UL roaming usage, DL non-roaming usage, DL roaming usage etc. A section 92 specifies any limits for when a charging record should be published. Limits can be expressed as a data volume or a time period, or a combination of a data volume-based limit and a time-based limit.

A more detailed example structure of an M2M charging record is as follows:

---

Charging Record_Subscription_xxxx.xml
{
timestamp (set when file is published)
subscriptionID
subscription VolumeLimitULNonroaming ( if exceeded, publish file )
subscription VolumeLimitDLNonroaming ( if exceeded, publish file )
subscription VolumeLimitULRoaming ( if exceeded, publish file )
subscription VolumeLimitDLRoaming ( if exceeded, publish file )
timeFileOpen
timeFileClose
subscriptionAggregatedDataVolumeULNonroaming
subscriptionAggregatedDataVolumeDLNonroaming
subscriptionAggregatedDataVolumeULRoaming
subscriptionAggregatedDataVolumeDLRoaming
    serviceID (1 ... m)
    {
      servicetimeLimit ( if exceeded, publish file )
      service VolumeLimitULNonroaming ( if exceeded, publish file )
      service VolumeLimitDLNonroaming ( if exceeded, publish file )
      service VolumeLimitULRoaming ( if exceeded, publish file )
      service VolumeLimitDLRoaming ( if exceeded, publish file )
      serviceAggregatedDataVolumeULNonroaming
      serviceAggregatedDataVolumeDLNonroaming
      serviceAggregatedDataVolumeULRoaming
      serviceAggregatedDataVolumeDLRoaming
        m2MDeviceIMSI (1 ... n)
        {
        dataVolumeULNonroaming
        dataVolumeDLNonroaming
        dataVolumeULRoaming
        dataVolumeDLRoaming
        }
    }
}

---

Figure 5:
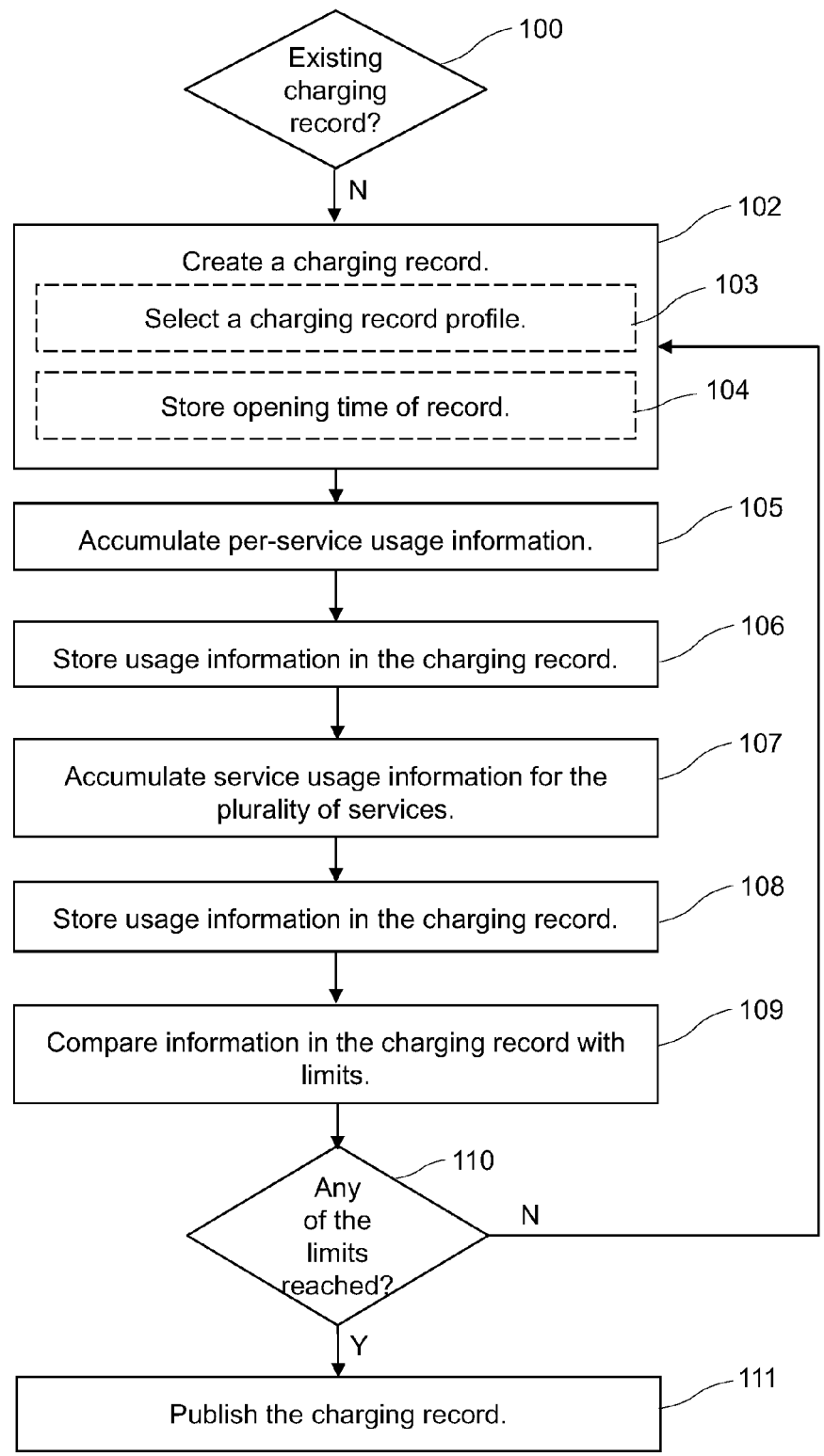
FIG. 5 shows a method of creating and updating a charging record.

FIG. 5 shows a method performed by a network entity which generates usage or charging information. This entity is usually a GGSN for non-roaming devices, and a SGSN for roaming devices.

When a request to activate a new PDP Context is received at an SGSN 55, the IMSI of the device making the request is checked. A check 100 is made if a charging record already exists for the particular subscriptionID, where the subscriptionID identifies the relationship between the service provider of services (including the particular service which is now being used by the M2M device) and the network operator).

If no charging record exists, a new record is created at step 102. The step of creating a new charging record can be achieved in various ways. In a first way, an entity such as the HLR can store a template charging record of the type shown in FIG. 5 which is configured for the number of services within the subscription (e.g. has the correct number of service sections 93, the correct number of M2M device sub-sections 96). The SGSN/GGSN retrieves the template corresponding to the subscriptionID. In a second way, an entity such as the HLR can store data which allows the charging record to be created (e.g. specifies the number of services, the number of M2M devices per service etc.) The SGSN/GGSN creates the charging record using the retrieved information corresponding to the subscriptionID. In either case, the information stored in the HLR may include values for per-service limits 95 (and per-subscription limits 92). Alternatively, information for the per-service limits 95 may be obtained from the M2M charging characteristics (CC) profile corresponding to the service that has just prompted creation of the charging record. The CC profile is selected based on the service request as indicated in the PDP Context and associated subscription data provided by the HLR. When other services within the same subscription are used, per-service limit values 95 are completed in the per-service section 93 of the charging record 90 corresponding to those services.

The time at which the record is opened, or created, is recorded in the record at step 104.

Usage information is accumulated, and stored, in the charging record at steps 105-109. At step 105, per-service usage information is accumulated and at step 106 this is recorded in sub-section 94 of the charging record 90. Usage information is aggregated for one or more M2M devices using the same service. This means that usage by any device subscribing to the service will increment the value of the accumulated usage recorded at step 106. Referring back to FIG. 1, usage of service #1 31 by any of the devices M2M1, M2M2, M2M3 will increment the accumulated usage recorded for service #1 31. At step 107, usage information is accumulated for the plurality of services and at step 108 the accumulated value is stored in section 91 of the charging record 90. The usage information stored in section 91 of the charging record is the sum of usage recorded in the multiple sub-sections 94. Additionally, usage information can be accumulated on a per-device basis and stored in sub-section 97 of the charging record in the section 96 relating to the device that used the service.

The charging record remains open, and private, until a point at which it is published. The term "private" means the charging record is not made available to the billing system. The charging record is only published when one of the limits 92, 95 is reached, or exceeded. The limits can be one or more of a time-based limit and a data volume-based limit. Step 109 compared information in the charging record with the limits in the charging record. If any of the limits are reached (or exceeded) at step 110, the charging record is published. The term "published" means the charging record is made available to an entity such as the charging gateway CGW 70, which will forward information to the billing system 75. The charging record can be transferred according to parameters specified in the subscription parameters, such as gtp-PrimeGateway and transfer-Type. Any PDP Context activations associated with this subscription ID will result in the creation of a new charging record.

The Charging Gateway CGW 70 or Billing System 75 may source additional charging data from HLR 50 for the subscription owner (charge/service/direction/data unit for both Non-roaming and Roaming).

The limits 92 at the per-subscription level, and limits 95 at the per-service level allow the charging record to be published after a period of time at which the charging record should contain a useful amount of data.

A reason to provide data volume limits 92 at the subscription level is to cover the scenario of multiple services within a subscription and none of the services reaching their respective volume limits 95. In this scenario, no charging data is made available to the operator, assuming no service time limit has been reached. One way of defining the subscription volume limit is:

subscriptionVolumeLimit=ΣserviceVolumeLimits+ (Number of services×Factor) where "Factor" has a value ≥1.

The embodiments described above assume that multiple services are provided by a service provider. In the event that only a single service is provided by a service provider, the charging record can be simplified. In one simplified form, the charging record (see FIG. 4) has one service section 93, and the usage information in section 91 mirrors the per-service usage information 94 in the service section 93. In another simplified form, the charging record has one service section 93, and the usage information in section 91 is omitted.

Figure 6:
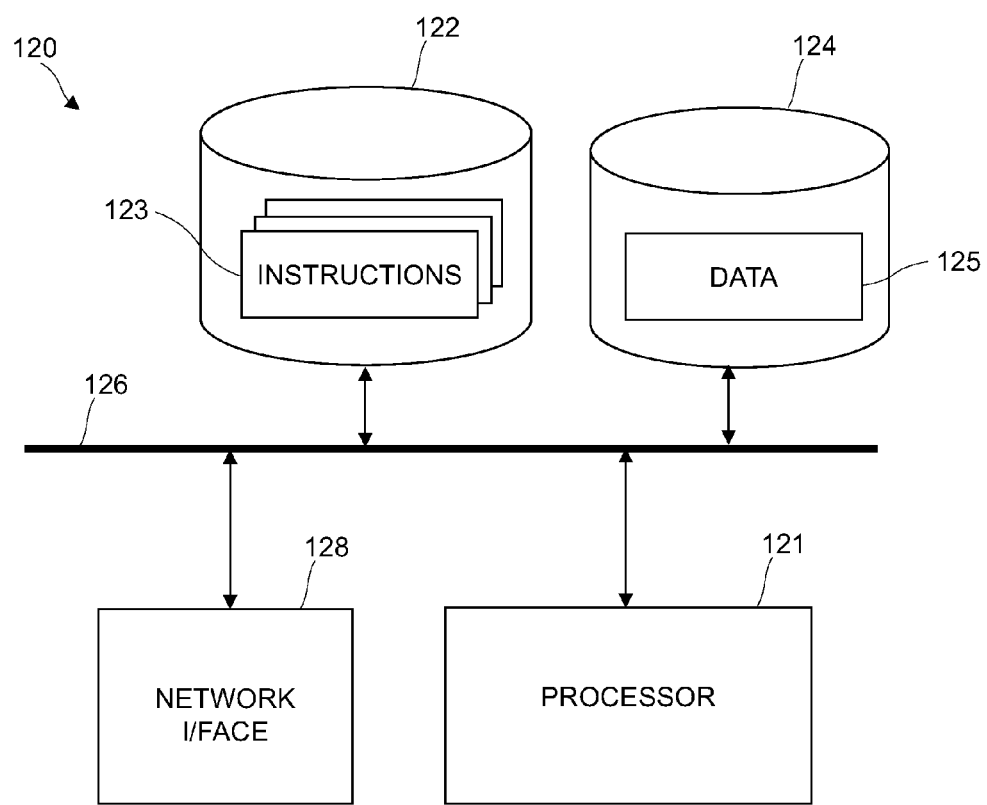
FIG. 6 shows apparatus for a computer-based implementation of the method.

FIG. 6 shows an exemplary processing apparatus 120 which may be implemented as any form of a computing and/or electronic device, and in which embodiments of the system and methods described above may be implemented. Processing apparatus 120 can be provided at the GGSN of the operator network. Processing apparatus may implement the method shown in FIG. 5. Processing apparatus 120 comprises one or more processors 121 which may be microprocessors, controllers or any other suitable type of processors for executing instructions to control the operation of the device. The processor 121 is connected to other components of the device via one or more buses 126. Processor-executable instructions 123 may be provided using any computer-readable media, such as memory 122. The memory is of any suitable type such as read-only memory (ROM), random access memory (RAM), a storage device of any type such as a magnetic or optical storage device. Additional memory 124 can be provided to store data 125 used by the processor 121. The processing apparatus 120 comprises one or more network interface inputs 128 for interfacing with other network entities.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of processing charging information for machine-to-machine (M2M) communication between at least one M2M device and an M2M service provider, wherein the service provider is a provider of a plurality of services, the method comprising:
   creating a charging record for recording usage information of the plurality of services of the service provider, wherein the step of creating the charging record comprises setting at least one of: a volume-based limit for publishing the charging record and a time-based limit for publishing the charging record;
   for each of the plurality of services, accumulating usage information for the service, wherein usage of the service by the at least one M2M device is aggregated;
   for each of the plurality of services, storing the accumulated usage information for the service in the charging record;
   based on information contained in the charging record, determining whether at least one of the volume-based limit and the time based limit has been reached or exceeded; and
   as a result of determining that at least one of the volume-based limit and the time based limit has been reached or exceeded, publishing the charging record.

2. The method according to claim 1 further comprising:
   accumulating usage information for the plurality of services of the service provider; and
   storing the usage information in the charging record.

3. The method according to claim 1, wherein the step of accumulating usage information separately accumulates usage information for uplink and downlink directions of communication.

4. The method according to claim 1, wherein the step of accumulating usage information separately accumulates usage information for roaming and non-roaming communication.

5. The method according to claim 1, further comprising:
   accumulating per-M2M device usage information for an individual one of the services of the service provider; and
   storing the per-M2M device usage information in the charging record.

6. The method according to claim 5, wherein the per-M2M device usage information for an individual one of the services is stored as an element within a part of the charging record for that service.

7. The method according to claim 1, wherein the step of creating a charging record comprises setting both of:
   a volume-based limit for publishing the charging record and a time-based limit for publishing the charging record; and
   the step of publishing the charging record occurs when one of the limits is reached or exceeded.

8. The method according to claim 1, wherein the at least one limit is associated with the aggregated per-service usage information.

9. The method according to claim 1, wherein the at least one limit is associated with the aggregated usage information for the plurality of services.

10. The method according to claim 1, wherein the step of creating a charging record comprises using one of a plurality of different charging record profiles, wherein each of the charging record profiles sets parameter values for the charging record.

11. The method according to claim 10, wherein each of the charging record profiles sets at least one of:

a volume-based limit for publishing the charging record to be associated with the per-service usage information; and a time-based limit for publishing the charging record.

12. A computer program product comprising a non-transitory machine-readable medium carrying instructions which, when executed by a processor, cause the processor to perform the method of claim 1.

13. An apparatus for creating charging information in a network in which there is machine-to-machine (M2M) communication between at least one M2M device and an M2M service provider, wherein the service provider is a provider of a plurality of services, the apparatus comprising:

a processor, a network interface; and a memory, wherein the processor is configured to:

create a charging record for recording usage information of the plurality of services of the service provider;

set at least one of: a volume-based limit for publishing the charging record and a time-based limit for publishing the charging record;

for each of the plurality of services, accumulate usage information for the service, wherein usage of the service b the at least one M2M device is aggregated;

for each of the plurality of services, store the accumulated usage information for the service in the charging record;

determine, based on information contained in the charging record, whether at least one of the volume-based limit and the time based limit has been reached or exceeded; and publish the charging record as a result of determining that at least one of the volume-based limit and the time based limit has been reached or exceeded.

14. The apparatus according to claim 13 in the form of one of: a Gateway GPRS Support Node, GGSN, and a Serving GPRS Support Node, SGSN.

15. A communication network comprising an apparatus according to claim 13.

* * * * *